Figure 2:
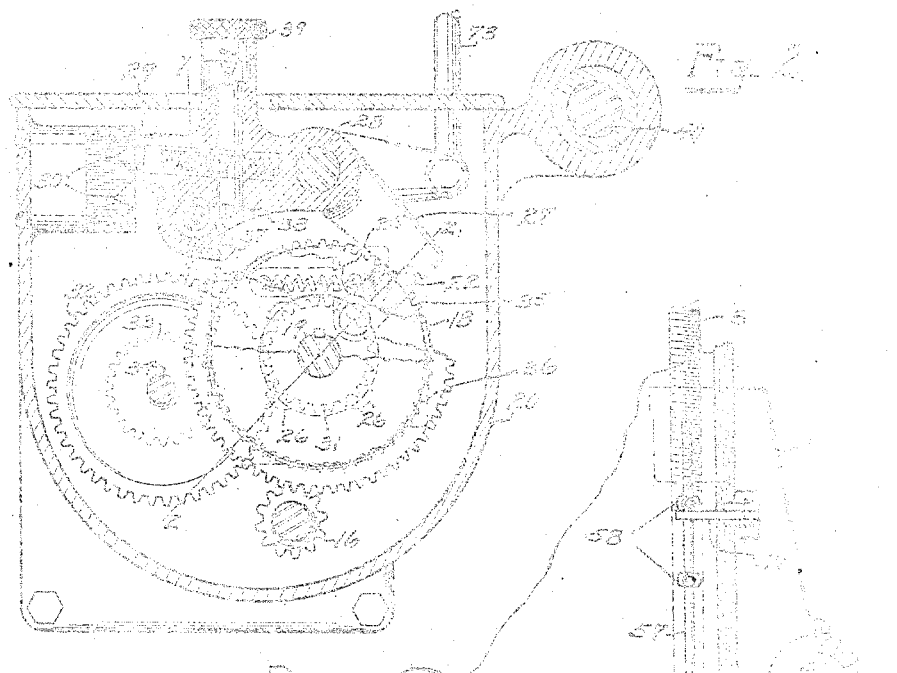

W. F. ZIMMERMANN.
GEAR CUTTING MACHINE OR THE LIKE.
APPLICATION FILED NOV. 15, 1910.

WITNESSES.

INVENTOR.
William F. Zimmermann

W. F. ZIMMERMANN.
GEAR CUTTING MACHINE OR THE LIKE.
APPLICATION FILED NOV. 15, 1910.
1,033,857.
Patented July 30, 1912.
3 SHEETS—SHEET 2.
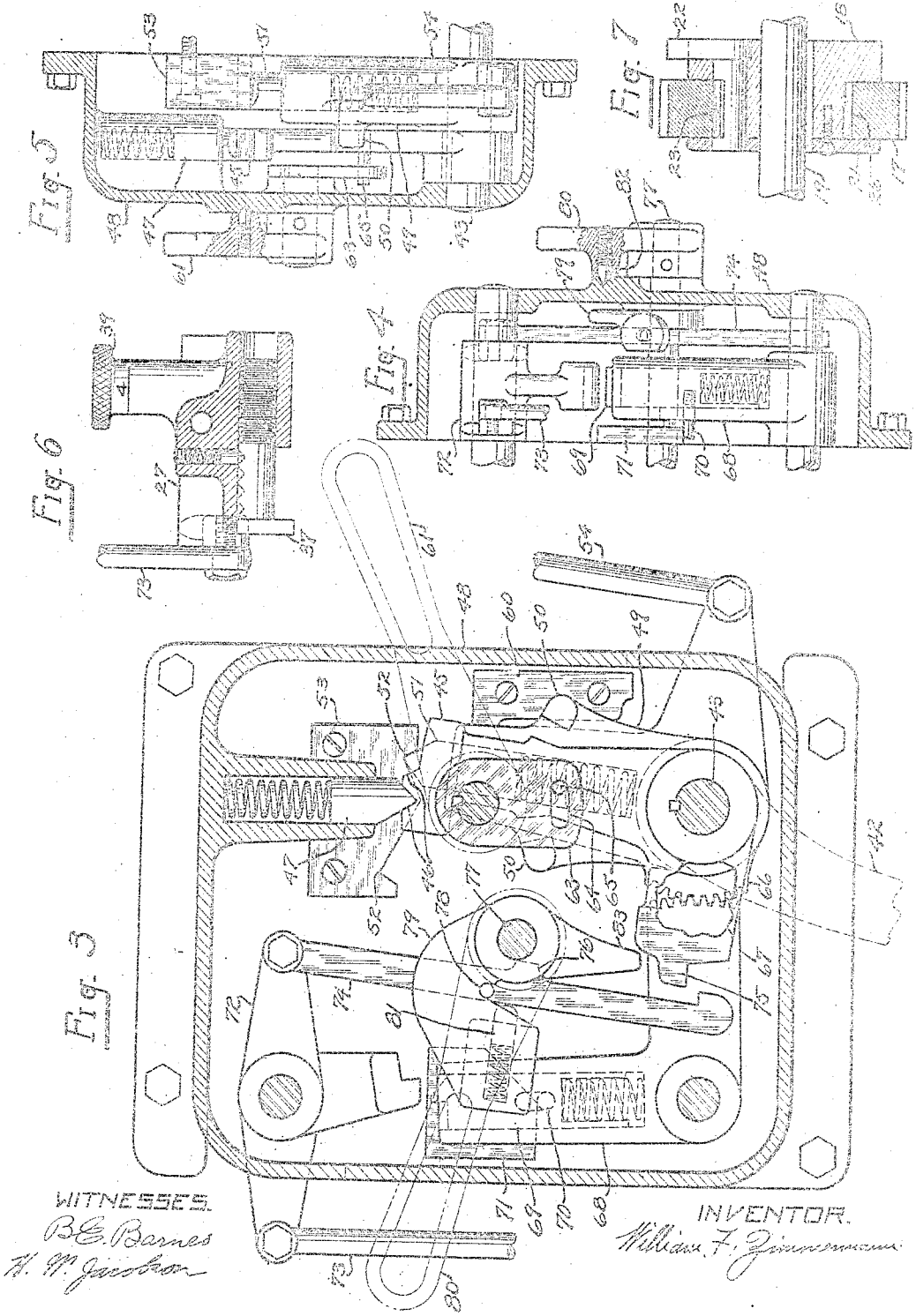
WITNESSES
B. E. Barnes
H. W. Jackson
INVENTOR.
William F. Zimmermann

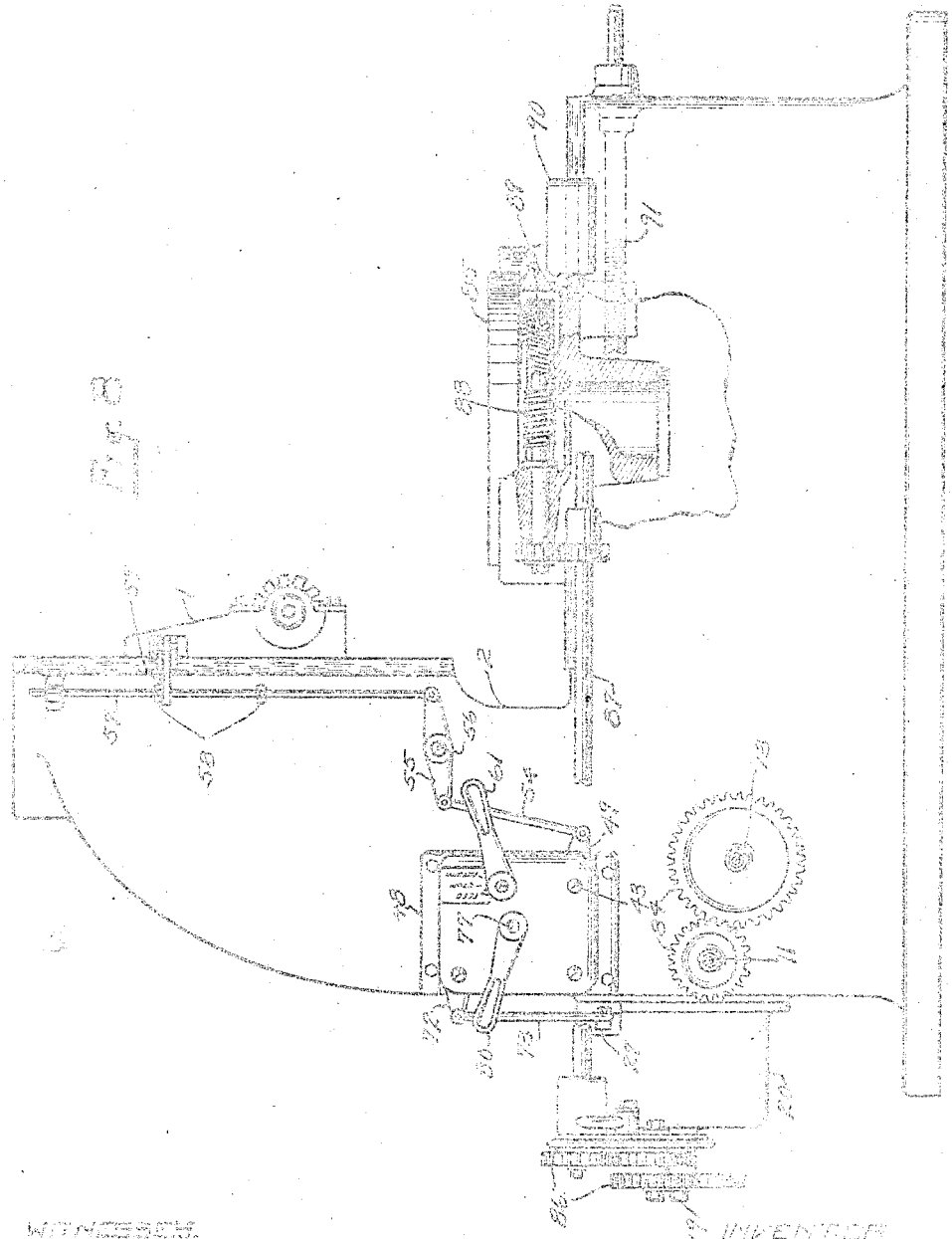

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

GEAR-CUTTING MACHINE OR THE LIKE.

1,033,857. Specification of Letters Patent. Patented July 30, 1912.

Original application filed July 31, 1909, Serial No. 510,657. Divided and this application filed November 15, 1910. Serial No. 592,454.

*To all whom it may concern:*

Be it known that I, WILLIAM F. ZIMMERMANN, a citizen of the United States, and a resident of the city of Newark, in the county of Essex and State of New Jersey, have invented certain new and useful Improvements in a Gear-Cutting Machine or the Like, and do hereby declare the following specification, taken in connection with the drawings, forming a part of the same, to be a full, clear, and exact description of the principle of said invention and the best mode in which I have contemplated applying that principle, so as to distinguish it from other inventions.

The invention relates primarily to machines that incorporate a tool holder and a work holder with means to reciprocate one of said holders with relation to the other, and means to impart an intermittent indexing movement to one of said holders at the end of each cycle of reciprocations, and more particularly to gear cutting and milling machines.

The object of this invention, which embodies subject matter, with certain new features added thereto, divided from the application filed July 31st, 1909, Serial Number 510,657 for metal working machines, is to provide an automatic controlling device to effect the reciprocations of a tool holder or the like and to intermittently index or space a work holder, which is contiguous to the tool holder, at the end of each cycle of reciprocations or of one excursion of said tool holder, and to maintain said tool holder inactive during said indexing movement.

Another feature of the invention relates to the arrangement of the levers, comprising the controlling device to so interlock, that each of the movements, to wit: the feeding and retracting movements of the tool holder and the indexing movement of the work holder, are conditions precedent to each succeeding movement, that is, each movement is controlled by and dependent upon the completion of each preceding movement.

Another feature relates to the arrangement for hand manipulation of said movements, whereby an operator can start any one of the above recited movements provided the others are inactive and completed at such time.

The invention comprises a tool holder with means to feed and retract same, a work holder, means to index said work holder, operated by each retracting movement of said tool holder, means to maintain said tool holder in a retracted position until the completion of said indexing movement and means operated by the completion of said indexing movement to start said feeding movement and means to manually effect each of said movements.

The annexed drawings and the following description set forth in detail certain mechanism, embodying means constituting, however, but one of the various mechanical forms, in which the principle of invention may be used.

The novelty of the invention will be readily understood from the drawings, which show so much of a gear cutting machine as to properly illustrate the invention in its preferred form and from the following description thereof.

The novelty of the invention will be more particularly pointed out in the claims annexed to said description.

Figure 1:
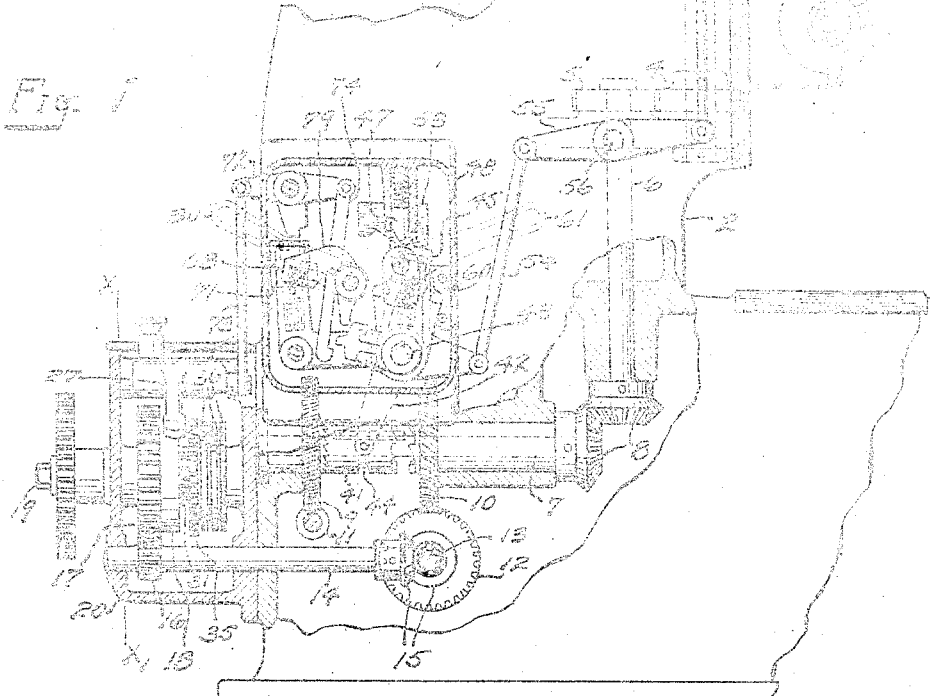

Referring to the drawings: Figure 1 is a partial side elevation of a gear cutting machine embodying the invention, and illustrating the indexing mechanism for the work holder. Fig. 2 is a sectional view of the indexing mechanism at X X$_1$ of Fig. 1. Fig. 3 is a sectional view of the controlling arrangement with the hand operating levers located on the outside of the casing, in dot and dash. Fig. 4 is a left-end elevation of Fig. 3 with the casing in section. Fig. 5 is a right end elevation of Fig. 3 with the casing in section. Fig. 6 is a sectional view of the index lever at Y Y$_1$ of Fig. 2. Fig. 7 is a sectional view of the index clutch at Z Z$_1$ of Fig. 2. Fig. 8 is a side elevation of the invention illustrating a connection between the work mandrel and index mechanism.

Referring particularly to Fig. 1, the tool holder or cutter carriage 1 is mounted to reciprocate vertically upon the main frame 2 and is connected to the reciprocating mechanism by the screw 3, which engages a threaded portion of the said carriage 1. The screw 3 is provided at its lower end with a gear 4 engaging with and rotated by a gear 5 secured to the vertical shaft 6. This vertical shaft 6 is connected to and rotated by a horizontal shaft 7 through a pair of bevel gears 8. The horizontal shaft 7 has loosely mounted thereon, two helical gear wheels 9 and 10 rotating in opposite directions and provided with clutch teeth on their opposing faces. The gear 9 rotates slowly for the feeding movement of the cutter carriage and is driven by the worm 11, and the gear 10 rotates rapidly for the retracting movement and is driven by the helical gear 12 secured to the main shaft 13, which is connected to any suitable source of power. The feed worm 11 receives its motion by suitable change wheels 84 connected to the retracting or main shaft 13 in any well known manner. A sliding clutch 41, having clutch teeth on each end thereof, is slidably keyed to the horizontal shaft 7 and arranged to alternately engage the feed and retracting gears 9 and 10 as hereinafter more fully described.

Referring now to Figs. 1 and 2, the index driving shaft 14 is connected to the main shaft 13 by means of the bevel gears 15. An index driving pinion 16, preferably integral with said index driving shaft 14, engages with and rotates the clutch gear 17, loosely mounted on and concentric with the clutch disk 18, which is keyed to the index shaft 19, mounted in a casing 20, inclosing the indexing mechanism. The clutch gear 17 is retained in position by the flange 21 secured to the clutch disk 18. A latch 22 is rotatably mounted within and at a distance from the center of said clutch disk 17, and arranged to couple and uncouple said constantly rotating clutch gear 17 and index shaft 19. A portion of the shank of said latch 22 is cut away at 23, equal in width to the clutch gear 17, to allow said gear to rotate freely upon said disk 18 when so desired. The latch 22 is urged, by a spring 24, to rock toward the forward abutment 25, formed by a depression in the clutch disk 18, whereby the driving portion of said latch 22 is brought into driving engagement with one of the concave recesses 26 provided in the clutch gear 17, thereby coupling the clutch disk 18 and with it the index shaft 19 to the constantly rotating clutch gear 17. The clutch disk 18 is held stationary by the engagement of the latch 22 with the index lever 27 whereby said latch is withheld from engagement with the recesses 26. The index lever 27 is arranged to rock on the shaft 28, secured in the casing 20, and is operated to allow the index shaft to rotate intermittently as hereinafter more fully described. A spring pressed plunger 29 is arranged in the lever 27 to engage with the notches 30 so as to maintain said lever in either the operative or inoperative position.

To control the number of rotations of the index shaft 19, or to time the uncoupling thereof from the clutch gear 17, a positive mechanism is provided which consists of a gear 31 secured to and rotating with said index shaft 19 and engaging with a gear 32, which is part of the gear 33 loosely mounted on the shaft 34 so that both gears 32 and 33 rotate in unison. The gear 33 engages with the gear 35 which is loosely mounted on the index shaft 19, and is provided with a series of cams 36 secured thereto, each of which is provided with a different number of lobes, such as one, two and four as used in the present structure. The cams 36 control the lever 27 by means of a sliding cam piece 37 slidable longitudinally in said lever 27 and adapted to be operated on by any of said cams 36 when it is desired to rotate the index shaft 19 either one, two or four rotations between the coupling and uncoupling of said index shaft 19 and the clutch gear 17. When it is desired to rotate said index shaft 19 continuously, the cam piece 37 is not in engagement with any one of the cams 36. Grooves in the form of a circular rack are provided on the sliding cam piece 37 for engagement with a pinion 38, whereby said cam piece 37 is properly positioned to be operated on by any one of the cams to obtain the desired number of rotations of the index shaft 19. The pinion 38 is rotatably mounted in the index lever 27 and is provided with a knurled knob 39 graduated to indicate the position of the cam piece 37 with relation to the cams 36.

The operation of this portion of the mechanism will now be described and is as follows: The index driving shaft 14 and pinion 16, which receive motion from the main shaft 13 as hereinbefore described are constantly rotating and drive the clutch gear 17. When the index lever 27 is rocked by means to be hereinafter described, to release the latch 22, the spring 24 actuates the latch 22 until it strikes the forward abutment 25 in the clutch disk 18, thereby engaging said latch with the next approaching recess 26, in the clutch gear 17, to positively couple the index shaft 19 with the constantly rotating clutch gear 17. The gear 31, which is secured to and rotates with the index shaft 19, rotates the double gear 32 and 33 which in turn rotate the gear 35 to which the cams 36 are secured. The cams 36 are therefore actuated by the rotations of the index shaft 19, when the same is coupled to the constantly rotating clutch gear 17. Assuming now that the sliding cam piece 37 is in the path of the cam having four lobes, the index lever 27 will be forced into the path of the latch 22, just prior to the completion of the first rotation of the index shaft 19; therefore the said index shaft 19 will only make one complete rotation for each rocking of the index lever 27 to release the latch 22. In the construction shown, the cams 36 are provided with one, two and four lobes respectively and the gearing which is composed of the gears 31, 32, 33 and 35, have a ratio of 1 to 4. The relation of the gearing ratio to the number of lobes in each one of the cams must be such, that the number of lobes in each and every cam, is a factor of the gearing ratio, so as to provide complete rotations of the index shaft 19, before the uncoupling thereof from the clutch disk 17. By shifting the cam piece 37 into the path of the cam having two lobes, the index shaft 19 will be constrained to make two rotations between each coupling and uncoupling of the gear 17 and shaft 19. When, however, the cam piece is moved into the path of the one-lobed cam, the shaft 19 will make four complete rotations for each rocking of the index lever 27 to release the latch. The index shaft 19 which is constrained to rotate intermittently between the reciprocations of the tool carriage, transmits intermittent motion to the work table 85 by means of suitable change wheels 86 between said index shaft 19 and shaft 40, and gears 87 between said shaft 40 and worm 88, which worm engages with a worm wheel 89 secured to the work table 85. (See Fig. 8.) The work table 85 is rotatably mounted in the work carriage 90, which is adjustably arranged upon the horizontal portion of the frame. A screw 91 is provided to adjust said work carriage.

The arrangement of levers, plungers and connecting rods, primarily operated by the cutter carriage, and located intermediate, the feeding and retracting mechanism and the indexing mechanism to control the sequence of, and interlock the various movements, will now be described. The reversing of clutch 41, slidably keyed to, and rotatable with the horizontal shaft 7, is operated by a rock lever 42 which is secured to the rock shaft 43 and engages the peripheral groove 44 in said clutch 41. The rock shaft 43 has keyed thereto, a reversing lever 45 provided with a series of notches 46 to determine the position thereof by engagement with the spring pressed plunger 47, arranged in the casing 48. The reversing lever 45 is operated by a lost motion lever 49 loosely mounted on the rock shaft 43. The lost motion lever 49 is provided with two abutments 50, between which the reversing lever 45 is located and by which it is operated. A wedge shaped spring pressed plunger 51 is arranged in the lost motion lever 49 to engage a series of notches 52 in the block 53. The notches 52 correspond to the position the lost motion lever 49 occupies when the reverse clutch 41 is in engagement with either the feeding or retracting gear, or when disengaged entirely from either of the gears, and occupying a neutral position. The lost motion lever 49 is operated by the cutter carriage 1, and is connected thereto by a link 54, a lever 55 pivoted at 56 on the frame 2, and the tappet rod 57 upon which two adjustable tappet or trip dogs 58 are mounted. A trip latch 59, projecting from the cutter carriage, is arranged between these tappet dogs, so as to alternately operate each one; the length of travel of the cutter carriage being determined by the position of the tappet dogs on the rod 57. A stop 60 for the lost motion lever 49 is arranged to limit the movement of said lever in both directions, as hereinafter described.

The reversing lever 45 is shown in a feeding position, that is, the reversing clutch 41 is in engagement with the feed gear 9 and the cutter carriage 1 is in the act of feeding downward. It will be noticed that the reversing lever 45 is entirely free from contact with either one of the abutments 50 on the lost motion lever 49, and is maintained in the position shown by the plunger 47. A hand lever 61 is arranged outside of the casing 48, and is secured to a shaft 62, extending through said casing and having keyed to the inner end thereof, a lever 63 provided with a slot 64. (See Fig. 5.) A pin 65, secured to the reversing lever 45, is arranged within the slot 64 and is operated thereby. By pressing the hand lever 61 downward, the reversing lever 45 would be moved to the right and thereby the reversing clutch disengaged from the feed gear 9 and the cutter carriage would be inactive. The plunger 47 would then be in contact with the right abutment 46, and the reversing lever 45 would be in contact with the left end abutment 50 on the lost motion lever 49. Further movement of the hand lever 61 in a downward direction, would operate the reversing lever and the lost motion lever to engage the reversing clutch with the retracting gear, and thereby retract the cutter carriage. This last mentioned movement of the hand lever 61 is, however, not sufficient to move the plunger 51 over the apex, formed by the notches 52 in the block 53. Therefore, when the hand lever 61 is released, the retracting movement will immediately stop, due to the spring pressed plunger 51, by its own inherent power or motive force, moving the reversing lever 45 into the middle position with the plunger 47 against the right abutment 46. The slot 64 is elongated as shown, for the purpose of allowing the automatic operation of the reversing lever 45, now to be described, without in any way moving the hand lever 61. This hand lever 61 is provided with a spring plunger 95 to maintain it in the position shown.

Assuming the cutter carriage to be feeding downward until the trip latch 59 strikes the lower tappet dogs and moves the tappet rod, and with it the lost motion lever 49 until the spring pressed plunger 51 is on the other side of the apex formed by the notch 52, the said plunger 51, by its own motive power, rapidly moves to the left notch 52 and carries with it the reversing lever and thereby engages the reversing clutch with the retracting gear and retracts the cutter carriage. The action of the spring pressed plunger 51, as described, is limited by the contact of the arm 92, of the lost motion lever 49, with the abutment 93 on the stop 60. When the action of said plunger 51 tends to move the lost motion lever in a reverse direction, said movement is limited by the abutment 94 as shown in Fig. 3. The retracting movement of the cutter carriage will operate the upper tappet dog and move the plunger 51 toward the position occupied in the drawings. The contact of the left abutment 50 with the reversing lever will move the reversing clutch into a middle or inoperative position and the clutch will be maintained in such position by the plunger 47 and because there is no further movement of the lost motion lever to move the clutch to the feeding position. The lost motion lever 49 is provided to insure a rapid disengaging of the clutches and to prevent the clutches from being gradually pulled apart by the movement of the cutter carriage. The reverse lever is not moved until the apex of the notch 52 has been passed by the plunger 51, when the clutches are rapidly withdrawn by the motive force of the plunger, thereby preventing the premature wear of the clutch teeth. As the lost motion lever moves from the retracting position by the retracting movement of the cutter carriage, and the clutch 41 is moved to a middle position, the indexing mechanism is unlocked by the lost motion lever. The completion of the indexing movement will then start the feed of the cutter carriage. The lever arrangement and the operation to unlock the indexing mechanism and to start the feed will now be described in detail. The lost motion lever 49 is provided with a gear segment 66, engaging with a similar gear segment 67 on the lever 68. A spring pressed plunger 69 is arranged in the lever 68, and provided with a pin 70 secured thereto to operate on an incline block 71 to alter the position of the plunger 69 as the lever 68 is rocked. The plunger 69 operates the downward extending arm 96 of a triple armed lever 72, having one end of the link 73 secured thereto, the other end whereof is attached to the index lever 27. The plunger 69 is withdrawn from contact with the arm 96, by means of the incline block 71 and pin 70, when the lever 72 has been rocked sufficiently to unlock the indexing mechanism.

The mechanism just described constitutes the index unlocking device and is operated by the lost motion lever when rocked from the retracting to the neutral position and the functions thereof are apparent and need no further elucidation.

The shifting mechanism for the reversing clutch actuated by the completion of the indexing movement is composed of a hook 74 attached to the triple armed lever 72 and arranged to actuate an arm 75 of the reversing lever 45, upon the completion of the indexing movement, that is, when the index lever 27 is rocked by one of the cams 36, to engage the latch 22 and thereby stop the indexing. A projection 76 is provided on the hook 74 to engage the shaft 77, whereby the hook is withdrawn from the arm 75 on its upward movement. A pin 78 is also provided on the hook to engage a cam like groove in the double armed lever 79, which is keyed to the shaft 77. A hand index lever 80 is secured to the outer end of the shaft 77, for the purpose of manually unlocking the indexing mechanism when so desired. A spring pressed plunger 81 is arranged, in the double armed lever 79 to press the hook 74 in engagement with the shaft 77.

To unlock the indexing mechanism manually, and assuming the reversing lever 45 to be in a neutral position, the hand index lever 80 is moved in a downward direction, thereby operating the triple armed lever through the pin 78 and hook 74. The hand lever 80 is then returned to its original position by the completion of the indexing movement, without the hook 74 having come into engagement with the reversing lever 45 due to the cam like groove in the lever 79. To hold the hand index lever 80 in either position, a small spring plunger 82 is arranged therein to engage depressions in the casing 48.

A safety device is provided to prevent the indexing mechanism being unlocked by hand when the reversing clutch is in engagement with the feed gear as shown in the drawings. This device consists of an arm 83, on the lever 79, arranged to strike against the arm 75 when in the position shown in Figs. 1 and 3, thereby preventing the index mechanism being unlocked. This arm 83 passes over the arm 75 when the reversing lever 45 is in a neutral position, that is, when the reversing clutch is entirely disengaged, thereby also preventing the feed from being started while the indexing movement is taking place, because upward movement of the arm 75 is prevented by the arm 83.

The general operation of the mechanism is as follows: The cutter carriage feeds downward until it strikes the lower tappet dog to move the reversing clutch from the feed to the retracting gear. The cutter carriage is retracted until it comes in contact with the upper tappet dog, when the reversing clutch is moved to a neutral position and held there by the plunger 47. Just before the completion of the retracting movement and during the time the cutter carriage is in contact with the upper tappet dog, the indexing mechanism is unlocked. The completion of the indexing movement as evidenced by the rocking of the index lever 27, by means of the cams 36, raises the hook 74 and thereby rocks the reversing lever 45 toward the feeding position. The amount of movement given to the reversing lever by the hook is merely enough to bring the teeth of the reversing clutch to the top of the teeth in the feed clutch and then when the clutches are in proper engaging relation to each other, the spring pressed plunger 47 operates to engage them properly.

Having described my invention and the mode of operation, I claim as new and desire to secure by Letters Patent:

1. The combination with a carriage, of a feeding and retracting mechanism therefor, an indexing mechanism, means operable by the retraction of said carriage to unlock said indexing mechanism means to lock said indexing mechanism and means actuated by said locking means to engage said feeding mechanism.

2. The combination with a carriage, of a feeding and retracting mechanism therefor, comprising a reversing clutch, an indexing mechanism, means operable by the retraction of said carriage to unlock said indexing mechanism, means to lock said indexing mechanism and means actuated by said locking means to move said reversing clutch into the feeding position.

3. The combination with a carriage, of a feeding and retracting mechanism therefor, comprising a reversing clutch, an indexing mechanism, means operable by said carriage to move said clutch into the retracting and the stop or neutral position and unlock said indexing mechanism means to lock said indexing mechanism and means actuated by said locking means to move said clutch into a feeding position.

4. The combination with a carriage, of a feeding and retracting mechanism therefor, comprising a reversing clutch, a lever for said clutch, means operable by said carriage to move said lever from the feeding position to the retracting and neutral position, an indexing mechanism, means coöperating with said lever to unlock said indexing mechanism means to lock said indexing mechanism and means operated by said locking means to move said lever from the neutral to the feeding position.

5. The combination with a carriage, of a feeding and retracting mechanism therefor, an indexing mechanism, including a shaft, a gear and a clutch mechanism to couple and uncouple said shaft and gear at predetermined intervals, means operable by the retraction of said carriage to couple said shaft and gear, and means actuated by said shaft to uncouple said shaft and gear and to engage the feeding motion of said carriage.

6. The combination with a carriage, of a feeding and retracting mechanism therefor, comprising a reversing clutch, an indexing mechanism including a shaft, a gear and mechanism to couple and uncouple said shaft and gear at predetermined intervals, means operable by the retraction of said carriage to move said reversing clutch into the neutral position and to couple said shaft and gear and means, actuated by said shaft to uncouple said shaft and gear and to move said reversing clutch into a feeding position.

7. The combination with a carriage, of a feeding and retracting mechanism, an indexing mechanism, comprising a shaft, and clutch mechanism to rotate said shaft at desired intervals, means operable by the retraction of said carriage to effect said intermittent rotations and means actuated by said shaft to disconnect said clutch mechanism and engage the feeding mechanism of said carriage.

8. The combination with a carriage, of a feeding and retracting mechanism, comprising a reversing clutch, an indexing mechanism, including a shaft and clutch mechanism to rotate said shaft at desired intervals, means operable by the retraction of said carriage to connect said clutch mechanism and to move said reversing clutch into a neutral position and positive mechanism actuated by said shaft to disconnect said clutch mechanism and move said reversing clutch into a feeding position.

9. The combination with a carriage, of a feeding and retracting mechanism therefor, comprising a reversing clutch, a lever to operate said clutch, an indexing mechanism comprising a shaft and clutch mechanism to rotate said shaft at desired intervals, means operable by the retraction of said carriage to move said lever into a neutral position and to connect said clutch mechanism and means actuated by said shaft to disconnect said clutch mechanism and move said lever into a feeding position.

10. The combination with a carriage, of a feeding and retracting mechanism therefor, a reversing lever, an indexing device, comprising a clutch mechanism, means operable by the retraction of said carriage to move said lever into a neutral position, and to couple said clutch mechanism, and means actuated by said indexing device to uncouple said clutch mechanism and move said lever to the feeding position.

11. The combination with a carriage, of a feeding and retracting mechanism therefor, a reversing lever, a shaft, means to intermittently rotate said shaft, means operable by said carriage, to move said reversing lever into a neutral position and to effect the rotations of said shaft, and means operable from said shaft to stop said rotations, and to move said lever into a feeding position.

12. The combination with a carriage, of a feeding and retracting mechanism therefor, a shaft, means to intermittently rotate said shaft, means operable by the retraction of said carriage to effect the rotations of said shaft, and means operable from said shaft to stop said rotations and to start said feeding mechanism.

13. The combination with a carriage, of a feeding and retracting mechanism therefor, an indexing mechanism, devices for controlling said feeding, retracting and indexing mechanism, comprising a lever operatively connected to said carriage with means to hold said lever in a retracting, indexing or feeding position until rocked therefrom, means coöperating with said lever to unlock said indexing mechanism, means to lock said indexing mechanism and means operable by said locking mechanism to rock said lever into the feeding position.

14. The combination with a carriage, of a feeding and retracting mechanism therefor, an indexing mechanism, a reversing lever operatively connected to said carriage, means to hold said lever in the feeding retracting or indexing position, until rocked therefrom, means coöperating with said lever to unlock said indexing mechanism, means to lock said indexing mechanism and means operable by said locking mechanism to rock said lever into the feeding position.

15. The combination with a carriage, of a feeding and retracting mechanism therefor, an indexing mechanism, means to manually operate said indexing mechanism, a reversing lever arranged to prevent said manual operation of the indexing mechanism, when said lever is in a feeding position.

16. The combination with a carriage, of a feeding and retracting mechanism therefor, comprising a reversing lever, an indexing mechanism, means to manually operate said indexing mechanism and reversing lever so arranged that the indexing mechanism cannot be manually operated when said lever is in a feeding position, and so that said reversing lever cannot be manually operated to engage the feeding mechanism when the indexing mechanism has been unlocked.

17. The combination with a carriage, of a feeding and retracting mechanism therefor, comprising a reversing lever, an indexing mechanism, an index lever to manually operate said indexing mechanism, a lever to manually operate said reversing lever, said reversing lever arranged to prevent said index lever being rocked when said reversing lever is in a feeding position, and said index lever arranged to prevent said reversing lever being rocked to a feed position when said indexing lever has been rocked to operate said indexing mechanism.

18. The combination with a carriage, of a feeding and retracting mechanism therefor, comprising a reversing lever, an indexing mechanism, an index lever to manually operate said indexing mechanism, said reversing lever arranged to prevent said indexing lever being rocked when said reversing lever is in a feeding position.

19. The combination with a carriage, of a feeding and retracting mechanism therefor, comprising a reversing lever, an indexing mechanism, means operable by said carriage to rock said lever, means coöperating with said lever to unlock said indexing mechanism, and a lever to manually operate said reversing lever without unlocking said indexing mechanism.

20. The combination with a carriage, of a feeding and retracting mechanism, a reversing lever therefor, a lost motion lever to actuate said reversing lever connected to said carriage, connections from said lost motion lever to said indexing mechanism to unlock same, and connections from said indexing mechanism to said reversing lever whereby said reversing lever is rocked to the feed position when said indexing mechanism is locked.

21. The combination with a carriage, of a feeding and retracting mechanism, a reversing lever therefor, a lost motion lever to actuate said reversing lever, connections from said lost motion lever to said carriage, whereby said reversing lever is rocked to a retracting and neutral position, an indexing mechanism, connections therefrom to said lost motion lever, whereby the indexing mechanism is unlocked, and connections from said indexing mechanism to said reversing lever, whereby said reversing lever is rocked to the feeding position, when said indexing mechanism is locked.

22. The combination with a carriage, of a feeding and retracting mechanism, a reversing lever therefor, connections therefrom to said carriage whereby said carriage is retracted and stopped, an indexing mechanism, a controlling device to actuate same, connections between said lever and controlling device to effect the indexing motion and other connections therebetween to actuate said lever, whereby the feed is engaged upon the completion of the indexing.

23. The combination with a carriage, of a feeding and retracting mechanism therefor, a reversing lever, connections therefrom to said carriage, whereby said carriage is retracted and stopped, an indexing mechanism, a controlling device to actuate same, connections between said controlling device and lever to effect the indexing motion and other connections therebetween to partially rock said lever into the feed position and means to complete the moving of said lever into the feed position.

24. The combination with a carriage, of a feeding and retracting mechanism, a reversing lever therefor, a lost motion lever to actuate said reversing lever connected to said carriage, an indexing mechanism, connections therefrom to said lost motion lever to unlock said indexing mechanism, and other connections therefrom to said reversing lever, whereby said reversing lever is rocked to the feed position upon the completion of the indexing.

25. The combination with a carriage, of a feeding and retracting mechanism, a reversing lever therefor, a lost motion lever to actuate said reversing lever connected to said carriage, an indexing mechanism connected to said lost motion lever, whereby said indexing is unlocked by the retraction of said carriage, and a lever to manually operate said reversing lever without affecting the indexing mechanism.

WILLIAM F. ZIMMERMANN.

Witnesses:
H. M. JACOBSON.
B. E. BARNES.